No. 748,777. PATENTED JAN, 5, 1904.
L. H. NASH.
WATER METER.
APPLICATION FILED JULY 5, 1900.
NO MODEL.
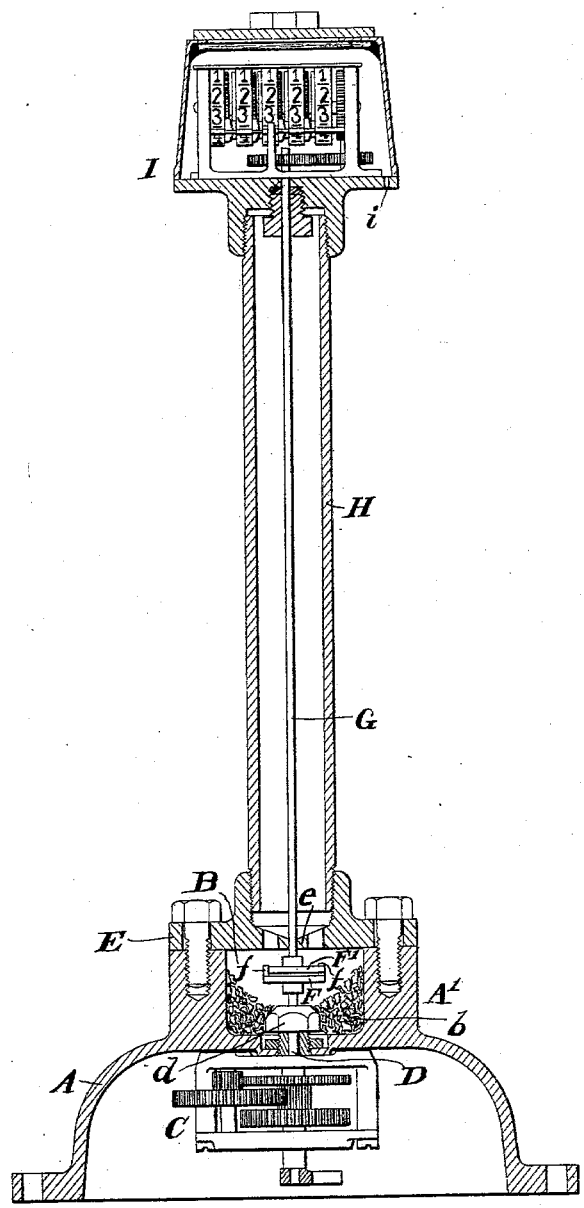
WITNESSES:
INVENTOR No. 748,777. Patented January 5, 1904.

UNITED STATES PATENT OFFICE.

LEWIS HALLOCK NASH, OF SOUTH NORWALK, CONNECTICUT, ASSIGNOR TO NATIONAL METER COMPANY OF NEW YORK, N. Y., A CORPORATION OF NEW YORK.

WATER-METER.

SPECIFICATION forming part of Letters Patent No. 748,777, dated January 5, 1904.

Application filed July 5, 1900. Serial No. 22,608. (No model.)

*To all whom it may concern:*

Be it known that I, LEWIS HALLOCK NASH, a citizen of the United States, and a resident of South Norwalk, in the county of Fairfield and State of Connecticut, have invented a new and Improved Water-Meter, of which the following is a full, clear, and exact description.

My invention relates to an improvement in water-meters by means of which the dial may be placed upon an extension to the meter-case, thus enabling the meter to be placed in positions where it cannot be directly examined and in further improvements whereby the mechanism connecting the dial and meter is prevented from freezing.

My invention comprises the further improvements which will be hereinafter described, and particularly pointed out in the claims.

The figure of drawing shows a sectional elevation of the parts of a meter which involve my invention.

The drawing presented shows a construction which I now prefer for carrying out my invention, although it will be evident that my invention may be carried out by other mechanisms which are substantially equivalent to those shown. The drawing is therefore presented simply as an illustration of a form of device which is now preferred by me.

The meter proper is not shown in the present drawing, as the form of meter with which my device is to be used is immaterial.

A part A, which is herein shown as a casting, is designed to form the upper cover of the meter-case and is secured thereto by any convenient means. This forms a chamber within which is placed the gearing C, by means of which the meter is connected with the dial. This gearing forms the reducing mechanism and at one end is connected by any suitable means with the meter-piston and at its other end is secured to the dial-operating shaft D. The member A, which forms the cover for the meter-case, is provided with an annular flange A', forming a chamber B, which is separated from the chamber containing the gearing C by a diaphragm, said diaphragm having an opening for the passage of the dial-operating shaft D and being also provided with any convenient form of stuffing-box or packing mechanism by means of which the opening through which the shaft D passes may be prevented from leaking. It is practically impossible under service conditions to prevent all leakage through this opening; and one object of my invention is to take care of this leakage in such a manner that the registering mechanism may not become frozen.

The chamber B is herein shown as being covered by a plate E, which is secured thereto by bolts. To this plate is also secured a pipe or tube H, which extends upwardly to any convenient point and at its upper end carries the case I, within which the dial mechanism is placed. The connection of said pipe or tube H and plate E with each other and with the meter-case or its cover A is made as nearly water-tight as possible, so as to prevent leakage.

The plate E is provided with openings connecting the chamber B with the interior of the tube H. It is also provided with a spider e, in which is journaled an extension-shaft G, which connects the shaft D with the dial mechanism contained in the casing I. A bearing for this shaft is also provided at its upper end near the dial-case. The two shafts D and G should preferably be connected with each other by some form of flexible coupling—that is, a coupling which will work without undue friction, even if the two shafts are not directly in line with each other. I have herein shown a coupling of this sort which consists of the two bars or disks F and F', secured one to each of the shafts and one of them provided with lugs *f*, which engage the other, so as to form a rotative connection and yet to permit of free operation, even if the shafts are not in line. Within the chamber B is placed a quantity of some substance which is soluble in water and the solution of which has a low freezing-point, such as sodium carbonate. Sodium carbonate is mentioned, because this has no deleterious effect upon iron and also because it is cheap. A solution of sodium carbonate has a much lower freezing-point than water, and consequently if the tube H contains a solution of this substance it will not freeze until its temperature becomes much lower than the freezing-point of water.

This improvement is particularly designed for application to meters where the meter is to be buried, either in the ground or where it will be overflowed by water. In this case the tube H should be of sufficient length as to carry the dial-case I to the surface or where it may be conveniently examined and read. In such situations the meter can as a rule be put at such a depth as to prevent its freezing and the dial-case be placed above ground, where it may be read, but where it would be likely to freeze if it or the tube connecting it with the meter should become filled with water.

In putting the meter in place the sodium carbonate or other chemical which is used is placed within the chamber B in its solid state. As water gradually enters this chamber about the shaft D or elsewhere the chemical is gradually dissolved and the solution which is thereby produced is of such character as to not freeze at ordinary temperatures. The amount of chemical introduced for this purpose should be such as will make a sufficiently strong solution for this purpose even when the entire tube H is filled with water. I do not wish to be limited to the use of sodium carbonate alone for this purpose, as I am aware that many other substances could be used to accomplish the same purpose.

Any substance the solution of which has a lower freezing-point than water and which will not destroy the parts might be used instead of sodium carbonate. If desired, an overflow-orifice may be provided in the upper end of the tube H or in the dial-casing which is connected therewith. Such an orifice is shown at $i$. A quantity of oil, glycerin, or similar substance placed in the tube H or chamber B would have much the same effect. In this case, however, it would be desirable to entirely fill the tube H and to provide a stuffing-box at the point where the rod G enters the dial-case. The presence of the oil, if no leakage from the tube H into the dial-chamber occurred, would reduce or neutralize the tendency of the water to leak from the measuring-chamber. If the oil, on the other hand, leaked into the dial-chamber, it would not interfere with the operation of the dial mechanism, although, if desired, a drainage-orifice might be there provided. So, also, the chamber H might be initially filled with any other fluid than oil freezing at a temperature below 32° Fahrenheit, and if a stuffing-box be employed where the rod enters the dial-chamber it will in all cases add its resistance to the resistance afforded by the joint or stuffing-box where the rod enters the chamber H, tending to prevent water leaking from the measuring-chamber.

If preferred, the chamber may be initially filled with oil and a substance inclosed therewith which is insoluble in oil and soluble in water to form a solution having a freezing-point below 32° Fahrenheit. In that case if the oil leaked from the chamber H water leaking in from the measuring-chamber would form a solution under the column of oil.

Having thus fully described my invention, I claim as new and desire to secure by Letters Patent—

1. In a meter, the combination with a measuring-chamber and a dial-chamber, of a chamber intermediate the meter and dial-chambers containing a substance soluble in water to form a solution having a freezing-point below 32° Fahrenheit.

2. A meter having an auxiliary chamber through which the dial-operating shaft passes, means for preventing the entrance of water into said chamber, and a soluble chemical in said chamber the solution of which has a freezing-point below 32° Fahrenheit.

3. In a meter the combination with distantly-separated measuring and registering apparatus and a shaft operatively connecting the same, of a closed tube surrounding said connecting-shaft, and containing a substance soluble in water to form a solution having a lower freezing-point than water.

In witness whereof I have signed my name to this specification in the presence of the two subscribing witnesses.

LEWIS HALLOCK NASH.

Witnesses:
H. L. REYNOLDS,
CHAS. J. RATHJEN.